US012650710B2

(12) United States Patent
Hong et al.

(10) Patent No.: US 12,650,710 B2
(45) Date of Patent: Jun. 9, 2026

(54) DISPLAY DEVICE FOR DETECTING BONDING DEFECTS

(71) Applicant: LG DISPLAY CO., LTD., Seoul (KR)

(72) Inventors: MooKyoung Hong, Paju-si (KR); SinKyun Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 350 days.

(21) Appl. No.: 17/976,122

(22) Filed: Oct. 28, 2022

(65) Prior Publication Data

US 2023/0213974 A1     Jul. 6, 2023

(30) Foreign Application Priority Data

Dec. 30, 2021     (KR) ........................ 10-2021-0192882

(51) Int. Cl.
*G06F 1/16*          (2006.01)
*G09G 3/00*          (2006.01)

(52) U.S. Cl.
CPC .......... *G06F 1/1652* (2013.01); *G06F 1/1677* (2013.01); *G09G 3/035* (2020.08); (Continued)

(58) Field of Classification Search
CPC ..... G06F 1/1652; G06F 1/1677; G09G 3/035; G09G 2330/04; G09G 2330/12; (Continued)

(56) References Cited

U.S. PATENT DOCUMENTS

2012/0105085 A1     5/2012   Chen et al.
2012/0161660 A1     6/2012   Joo
                    (Continued)

FOREIGN PATENT DOCUMENTS

CN          103903578 A       7/2014
CN          106205439 A      12/2016
                    (Continued)

OTHER PUBLICATIONS

Kim et al., Machine Translation of Foreign Patent Document WO2021193348A1, Laminate, Sep. 30, 2021, pp. 1-48 , (Year: 2021).*

(Continued)

*Primary Examiner* — Amr A Awad
*Assistant Examiner* — Maheen I Javed
(74) *Attorney, Agent, or Firm* — Birch, Stewart, Kolasch & Birch, LLP

(57)                    ABSTRACT

A display device can include a display panel including a display area in which sub-pixels are disposed, and a non-display area adjacent to the display area and in which a second pad portion is disposed, a printed circuit board including a first pad portion for outputting voltages to the display panel, and a circuit film including a first end connected to the first pad portion of the printed circuit board and a second end connected to the second pad portion of the display panel. The display device can further include an analog-to-digital converter to receive a voltage output from the first pad portion or the second pad portion through a line in the circuit film electrically connecting the first pad portion with the second pad portion, and output a value corresponding to the voltage input for detecting a bonding state of at least one internal component within the display device.

20 Claims, 12 Drawing Sheets

(52) U.S. Cl.
CPC ..... *G09G 2330/04* (2013.01); *G09G 2330/12* (2013.01); *G09G 2380/02* (2013.01)

(58) Field of Classification Search
CPC ....... G09G 2380/02; G09G 2300/0426; G09G 3/20; G09G 3/3208; G09G 3/36; G09G 2310/08; G01R 31/71; G02F 1/133305; G02F 1/13452; G02F 2203/69; G02F 1/1309; H05K 1/0268; H05K 3/361; H05K 1/147; H05K 2201/10128; H10K 2102/311; G09F 9/301

See application file for complete search history.

(56) References Cited

U.S. PATENT DOCUMENTS

| | | | | |
|---|---|---|---|---|
| 2014/0187088 | A1 * | 7/2014 | Kim | G02F 1/1309 |
| | | | | 439/620.01 |
| 2016/0187122 | A1 * | 6/2016 | Krimon | G01L 1/24 |
| | | | | 356/32 |
| 2017/0075466 | A1 * | 3/2017 | Xu | G06F 1/1652 |
| 2020/0312220 | A1 | 10/2020 | Hussell et al. | |
| 2021/0151513 | A1 | 5/2021 | Lee et al. | |
| 2022/0375880 | A1 * | 11/2022 | Kim | G06F 3/04164 |
| 2024/0397626 | A1 * | 11/2024 | Zhang | G09G 3/3233 |

FOREIGN PATENT DOCUMENTS

| | | | | | |
|---|---|---|---|---|---|
| CN | 106291999 | A | | 1/2017 | |
| CN | 106816135 | A | | 6/2017 | |
| CN | 108594017 | A * | 9/2018 | ............. G01R 27/02 |
| CN | 111356967 | A * | 6/2020 | ............. G06F 3/00 |
| CN | 111816124 | A | | 10/2020 | |
| CN | 113552460 | A | | 10/2021 | |
| JP | 2021-4968 | A | | 1/2021 | |
| KR | 10-2012-0071971 | A | | 7/2012 | |
| KR | 10-2016-0078636 | A | | 7/2016 | |
| KR | 2016078636 | A * | 7/2016 | ............. G02F 1/133 |
| KR | 10-2016-0108639 | A | | 9/2016 | |
| KR | 10-2017-0080219 | A | | 7/2017 | |
| KR | 10-2019-0014984 | A | | 2/2019 | |
| KR | 10-2021-0026929 | A | | 3/2021 | |
| KR | 10-2244247 | A | | 4/2021 | |
| WO | WO-2021193348 | A1 * | 9/2021 | |
| WO | WO-2023103076 | A1 * | 6/2023 | ............. G09F 9/301 |

OTHER PUBLICATIONS

Zhang et al., Machine Translation of Foreign Patent Document CN 108594017A, Bonding impedance detecting system and method , Sep. 28, 2018, pp. 1-14 (Year: 2018).*
Hu, Qi, Machine Translation of Foreign Patent Document WO 2023/103076A1, Deformation control method and deformation control device for flexible display panel, Jun. 15, 2023, pp. 1-18 (Year: 2023).*

* cited by examiner

*140* *FIG.3*

| BCS | | Operation |
|---|---|---|
| BCSa | BCSb | |
| 0 | 0 | Normal Bending |
| 0 | 1 | Bending Speed Decreases |
| 1 | 0 | Bending Curvature Increases |
| 1 | 1 | Bending Operation Not Performed |

DISPLAY DEVICE FOR DETECTING BONDING DEFECTS

CROSS REFERENCE TO RELATED APPLICATION

This application claims priority to Korean Patent Application No. 10-2021-0192882, filed in the Republic of Korea on Dec. 30, 2021, the entirety of which is hereby incorporated by reference into the present application.

BACKGROUND OF THE DISCLOSURE

Technical Field

Embodiment of the present disclosure relate to a display device.

Discussion of the Related Art

As the information society develops, there is increasing the demand for a display device for displaying an image in various forms, and in recent years, various display devices, such as a liquid crystal display device and an organic light emitting display device, are utilized.

Recently, in order to provide a user with a highly immersive image viewing environment, there has been used display devices of various form factors.

A flexible display device has been proposed as an example of various form factors. The flexible display device can implement various designs and has advantages in portability and durability. The flexible display device can be implemented as a display device of various types, such as a bendable display device, a foldable display device, and a rollable display device.

Meanwhile, the flexible display device has a key feature in providing the user with an experience in which the shape of the flexible display is variable. Accordingly, there is a demand for a flexible display device having high durability so that a shape change can be repeatedly performed.

For example, as a flexible display is repeatedly bent and unbent during its lifetime of use, the bonding conditions for internal components may deteriorate and be peeled apart or become disconnected, which can impair image quality and shorten the lifespan of the flexible display device. Thus, there is a need for being able to accurately detect and identify impaired internal bonding conditions and their specific locations within the flexible display device, and being able to dynamically adjust allowed bending characteristics of the flexible display device based the identified internal bonding conditions.

SUMMARY OF THE DISCLOSURE

Embodiments of the present disclosure can provide a display device.

Embodiments of the present disclosure can provide a display device including a display panel including a display area in which a plurality of sub-pixels are disposed, and a non-display area positioned around or adjacent to the display area and in which a pad portion is disposed, a printed circuit board including a pad portion for outputting a plurality of voltages input to the display panel, a circuit film including one end connected to a first pad portion which is the pad portion of the printed circuit board and the other end connected to a second pad portion which is the pad portion of the display panel, and an analog-to-digital converter for receiving a voltage output from the first pad portion or a voltage output from the second pad portion through a line of the circuit film electrically connecting the first pad portion and the second pad portion, and outputting a digital value corresponding to the voltage input.

Embodiments of the present disclosure can provide a display device including a display panel including a display area in which a plurality of sub-pixels are disposed, and a non-display area positioned around or adjacent to the display area and in which a pad portion is disposed, a printed circuit board including a pad portion for outputting a plurality of voltages input to the display panel, a circuit film including one end connected to a first pad portion which is the pad portion of the printed circuit board and the other end connected to a second pad portion which is the pad portion of the display panel, and an analog-to-digital converter for receiving a voltage output from the first pad portion or a voltage output from the second pad portion through a line of the circuit film electrically connecting the first pad portion and the second pad portion, in which a flexible characteristic of the display panel varies according to a voltage value input to the analog-to-digital converter.

According to embodiments of the present disclosure, it is possible to provide a display device in which flexible characteristics can be adjusted according to a connection state between components of a flexible display device.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION OF THE EMBODIMENTS

Figure 1:
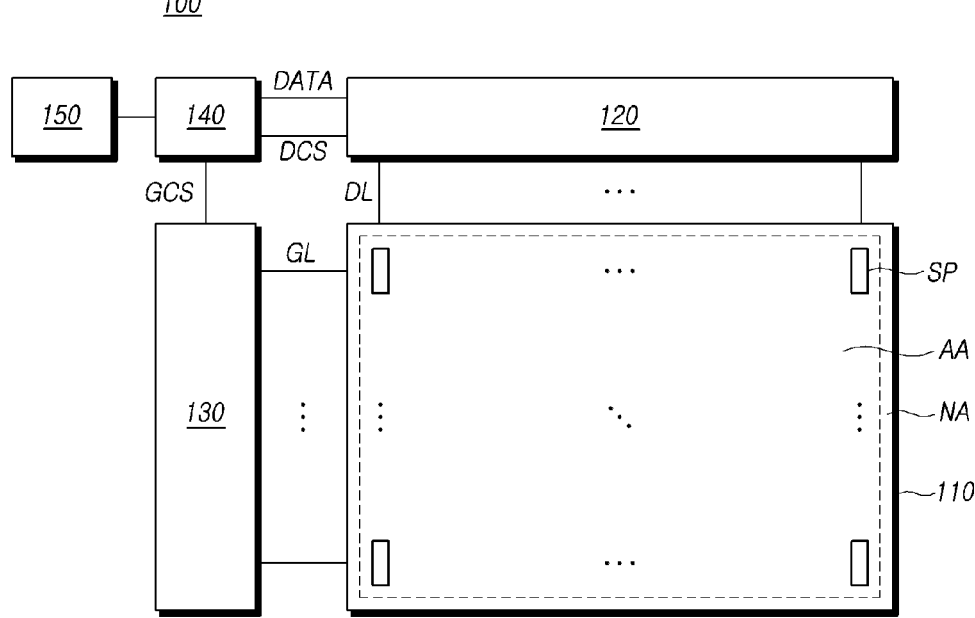
FIG. 1 schematically illustrates a display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element can be included in at least one of two or more elements that "are connected or coupled to," "contact or overlap." etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can."

Hereinafter, various embodiments of the present disclosure will be described in detail with reference to the accompanying drawings.

FIG. 1 is a diagram schematically illustrating a display device 100 according to embodiments of the present disclosure.

Referring to FIG. 1, a display device 100 according to embodiments of the present disclosure can include a display panel 110, a data driving circuit 120 and a gate driving circuit 130 for driving the display panel 110, and a timing controller 140 configured to control the data driving circuit 120 and the gate driving circuit 130.

Signal lines, such as a plurality of data lines DL and a plurality of gate lines GL, can be disposed on the display panel 110 on a substrate. A plurality of sub-pixels SP electrically connected to a plurality of data lines DL and a plurality of gate lines GL can be disposed on the display panel 110.

The display panel 110 can include a display area AA in which an image is displayed and a non-display area NA in which an image is not displayed. A plurality of sub-pixels SP for displaying an image are disposed in the display area AA. The data driving circuit 120 and the gate driving circuit 130 can be mounted in the non-display area NA, or a pad portion connected to the data driving circuit 120 or the gate driving circuit 130 can be disposed.

The data driving circuit 120 is a circuit configured to drive a plurality of data lines DL, and can supply a data voltage to the plurality of data lines DL. The gate driving circuit 130 is a circuit configured to drive the plurality of gate lines GL, and can supply gate signals (also referred to as gate voltages or scan signals) to the plurality of gate lines GL. The timing controller 140 can supply a data driving timing control signal DCS to the data driving circuit 120 to control the operation of the data driving circuit 120. The timing controller 140 can supply a gate driving timing control signal GCS for controlling the operation timing of the gate driving circuit 130 to the gate driving circuit 130.

The timing controller 140 can start a scan according to the timing implemented in each frame, convert the input image data input from the outside to match the data signal format used by the data driving circuit 120, supply the converted image data DATA to the data driving circuit 120, and control the data driving at an proper time according to the scan.

The timing controller 140 can receive, together with the input image data, various timing signals including a vertical synchronization signal Vsync, a horizontal synchronization signal Hsync, an input image data enable signal DE, and a clock signal CLK from a host system 150.

The timing controller 140 can, in order to control the data driving circuit 120 and the gate driving circuit 130, receive the vertical synchronization signal Vsync, the horizontal synchronization signal Hsync, the input data enable signal DE, and the clock signal CLK, etc., and can generates various control signals (e.g., DCS, GCS, etc.) to output to the data driving circuit 120 and the gate driving circuit 130.

The timing controller 140 can output various data driving timing control signals DCS including a source start pulse SSP, a source sampling clock SSC, and the like in order to control the data driving circuit 120.

The timing controller 140 can output various gate driving timing control signals GCS including a gate start pulse GSP, a gate shift clock GSC, a gate output enable signal GOE and the like in order to control the gate driving circuit 130.

The data driving circuit 120 receives the converted image data DATA from the timing controller 140 and drives the plurality of data lines DL.

The data driving circuit 120 can include one or more source driver integrated circuits SDICs.

Each source driver integrated circuit SDIC can be connected to the display panel 110 by a tape automated bonding (TAB) method, or can be connected to the bonding pad of the display panel 110 in a chip-on-glass (COG) method, or can be implemented in a chip-on-film (COF) method to be electrically connected to the display panel 110.

The gate driving circuit 130 can output a gate signal having a turn-on level voltage or a gate signal having a turn-off level voltage under the control of the timing controller 140. The gate driving circuit 130 can drive the plurality of gate lines GL by supplying a gate signal having a turn-on level voltage to the plurality of gate lines GL.

The gate driving circuit 130 can be connected to the display panel 110 by a tape automatic bonding (TAB) method, or can be connected to the bonding pad of the display panel 110 by a chip-on-glass (COG) method or a chip-on-panel (COP) method, or can be electrically connected to the display panel 110 according to a chip-on-film (COF) method.

The gate driving circuit 130 can be formed in the non-display area NA of the display panel 110 in a gate-in-panel (GIP) type. The gate driving circuit 130 can be disposed on or connected to the substrate of the display panel 110. In the situation of the gate-in-panel (GIP) type, the gate driving circuit 130 can be disposed in the non-display area NA of the substrate. The gate driving circuit 130 can be connected to the substrate of the display panel 110 in the situation of a chip-on-glass (COG) method or a chip-on-film (COF) method.

If a specific gate line GL is turned on by the gate driving circuit 130, the data driving circuit 120 can convert the image data received from the timing controller 140 into an analog data voltage to supply to the plurality of data lines DL.

The data driving circuit 120 can be connected to one side (e.g., an upper side or a lower side) of the display panel 110. Depending on the driving method, the panel design method, etc., the data driving circuit 120 can be connected to both sides (e.g., upper side and lower side) of the display panel 110, or can be connected to two or more of the four sides of the display panel 110.

The gate driving circuit 130 can be connected to one side (e.g., left side or right side) of the display panel 110. Depending on the driving method, the panel design method, etc., the gate driving circuit 130 can be connected to both sides (e.g., left side and right side) of the display panel 110, or can be connected to two or more of the four sides of the display panel 110.

The timing controller 140 can be a timing controller used in a conventional display technology, or can be a control device capable of further performing other control functions including the timing controller, or can be a circuit within the control device. The timing controller 140 can be implemented with various circuits or electronic components, such as an integrated circuit (IC), a field programmable gate array (FPGA), an application specific integrated circuit (ASIC), or a processor.

The timing controller 140 can be mounted on a printed circuit board (PCB), a flexible printed circuit board (FPCB), etc., and can be electrically connected to the data driving circuit 120 and the gate driving circuit 130 through a printed circuit board (PCB), a flexible printed circuit board (FPCB), or the like.

The timing controller 140 can transmit/receive signals to and from the data driving circuit 120 according to one or more predetermined interfaces. Here, for example, the interface can include a low voltage differential signaling (LVDS) interface, an EPI interface, and a serial peripheral interface (SPI).

The timing controller 140 can include a storage medium such as one or more registers.

The display device 100 according to the embodiments of the present disclosure can be a display device including a liquid crystal display (LCD) device with a backlight unit, or can be a self-luminous display device, such as an organic light emitting diode (OLED) display, a quantum dot display, and a micro light emitting diode (micro LED) display.

In the situation that the display device 100 according to the embodiments of the present disclosure is an OLED display, each sub-pixel SP can include an organic light emitting diode (OLED) emitting light as a light emitting element. If the display device 100 according to embodiments of the present disclosure is a quantum dot display, each sub-pixel SP can include a light emitting device made of quantum dots, which are semiconductor crystals that emit light by themselves. In the situation that the display device according to embodiments of the present disclosure is a micro LED display, each sub-pixel SP can include the micro LED as a light emitting device, which emits light by itself and is made from inorganic materials. Hereinafter, for convenience of description, the display device 100 according to embodiments of the present disclosure will be described with an OLED display as an example, but the present disclosure is not limited thereto.

Meanwhile, in the situation that the display device 100 according to the embodiments of the present disclosure is a self-luminous display device, the display panel 110 according to the embodiments of the present disclosure can be a flexible display panel.

Figure 2:
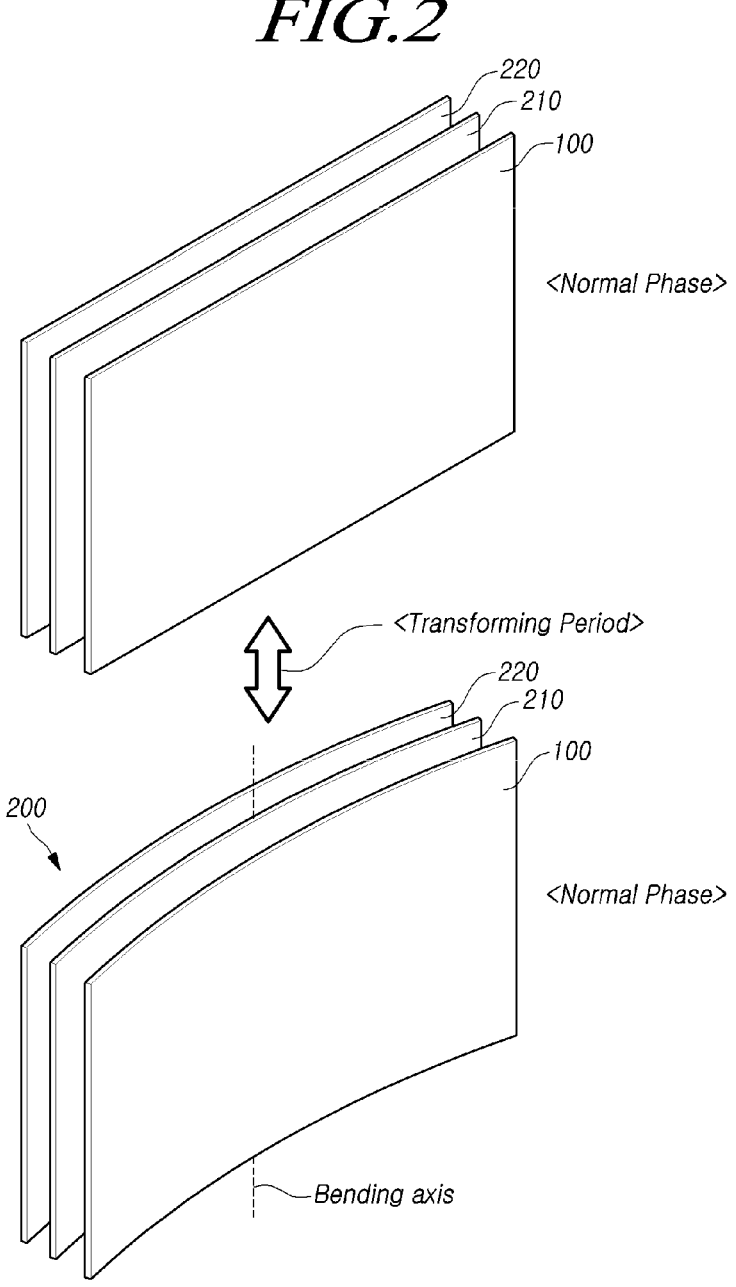
FIG. 2 is a perspective view of a flexible display device including a display device according to embodiments of the present disclosure.

FIG. 2 is a perspective view of a flexible display device 200 including the display device 100 according to embodiments of the present disclosure.

Referring to FIG. 2, the flexible display device 200 according to embodiments of the present disclosure can include the display device 100 and a back cover 210 disposed on the rear side of the display device 100. In addition, the flexible display device 200 according to embodiments of the present disclosure can further include a cover member 220 disposed on the rear side of the back cover 210.

The flexible display device 200 according to embodiments of the present disclosure can change to a flat shape or a curved shape. Specifically, in the flexible display device 200 according to embodiments of the present disclosure, a shape can be changed from a flat shape to a curved shape, or a shape can be changed from a curved shape to a flat shape. Accordingly, the flexible display device 200 according to embodiments of the present disclosure can be implemented in various forms, such as a bendable display device, a foldable display device, or a rollable display device.

Referring to FIG. 2, the flexible display device 200 according to embodiments of the present disclosure can have one or more bending axes. For example, in the flexible display device 200, the shape of the flexible display device 200 can be changed so that left and right sides of the display device 100 face forward with respect to the bending axis.

The flexible display device 200 can be folded based on one or more bending axes.

One or more bending axes can be located at the center of the flexible display device 200, or can be located close to an edge away from the center.

Referring to FIG. 2, the bending axis can extend from the upper side to the lower side of the flexible display device 200. Alternatively, the bending axis can extend from the left to the right of the flexible display device, or alternatively, extend from one side to the other side, or in a diagonal direction.

Meanwhile, in the situation that the shape of the flexible display device 200 is changed from a flat shape to a curved shape or from a curved shape to a flat shape, a stress can be applied to the components provided within the display device 100 and the back cover 210 due to a change in shape.

For example, the shape of the flexible display device 200 can change from a normal flat shape in a normal phase during a transforming period. When the transforming period terminates, the flexible display device 200 can have a normal curved shape.

Alternatively, the shape of the flexible display device 200 can be changed during the transforming period from the normal curved shape. When the transforming period terminates, the shape of the flexible display device can be a normal flat shape.

Compared to the normal state, there can be applied more stress to the display device 100 during the transforming period in which the shape change occurs. Accordingly, during the transforming period, there can occur a problem in which the bonding state between components of the display device 100 deteriorates, and there is required a solution to this problem. For example, when a flexible display is repeatedly bent or flexed, display components can become damaged (e.g., cracked, unbonded, disconnected etc.).

Figure 3:
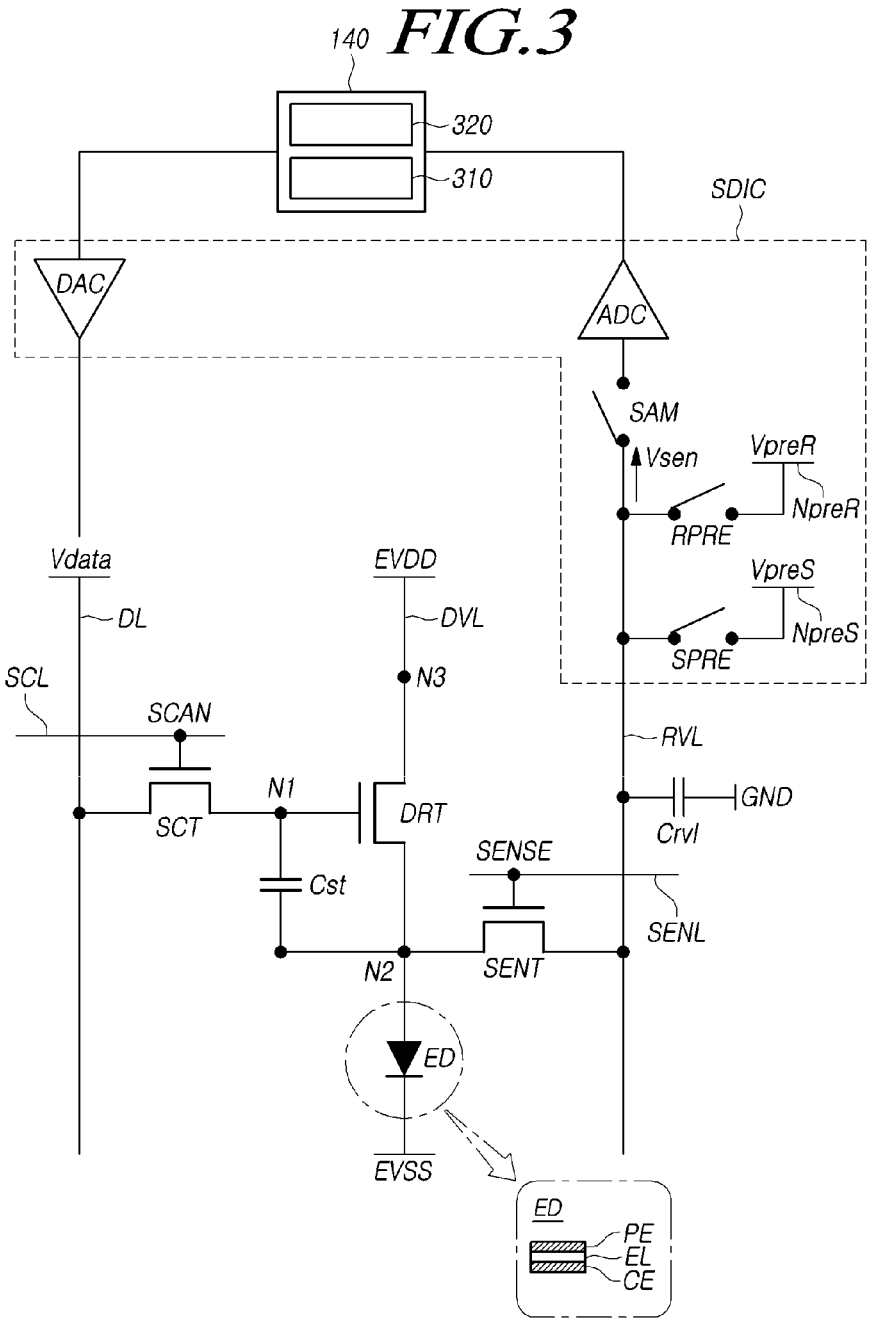
FIG. 3 schematically illustrates a sub-pixel structure and a configuration for compensating a characteristic value of a sub-pixel of a display device according to embodiments of the present disclosure.

FIG. 3 is a diagram briefly illustrating a structure of a sub-pixel SP of a display device and a configuration for sensing and compensating for characteristic values (e.g., voltage threshold, mobility, OLED degradation) of the sub-pixel SP according to embodiments of the present disclosure.

Referring to FIG. 3, each of the plurality of sub-pixels SP can include a light emitting device ED, a driving transistor DRT, a scan transistor SCT, and a storage capacitor Cst.

The light emitting device ED can include a first electrode and a second electrode and a light emitting layer EL positioned between the first electrode and the second electrode.

The first electrode of the light emitting device ED is a pixel electrode PE, and the second electrode of the light emitting device ED is a common electrode CE.

The pixel electrode PE of the light emitting device ED can be an electrode disposed in each sub-pixel SP, and the common electrode CE can be an electrode commonly disposed in all sub-pixels SP. Here, the pixel electrode PE can be an anode electrode and the common electrode CE can be a cathode electrode. Alternatively, the pixel electrode PE can be a cathode electrode and the common electrode CE can be an anode electrode.

For example, the light emitting device ED can be an organic light emitting diode OLED, a light emitting diode LED, or a quantum dot light emitting device.

The driving transistor DRT is a transistor for driving the light emitting device ED, and can include a first node N1, a second node N2, a third node N3, and the like.

The first node N1 of the driving transistor DRT can be a gate node of the driving transistor DRT, and can be electrically connected to a source node or a drain node of the scan transistor SCT. The second node N2 of the driving transistor DRT can be a source node or a drain node of the driving transistor DRT, and can be electrically connected to a source node or a drain node of the sensing transistor SENT can also be electrically connected to the pixel electrode PE of the light emitting device ED. The third node N3 of the driving transistor DRT can be electrically connected to a driving voltage line DVL supplying a high potential driving voltage EVDD.

The scan transistor SCT can be controlled by a scan pulse SCAN, which is a type of gate signal, and can switch an electrical connection between the first node N1 of the driving transistor DRT and the data line DL. That is, the scan transistor SCT can be turned on or turned off according to the scan pulse SCAN supplied from the scan line SCL, which is a type of the gate line GL, and can control an electrical connection between the data line DL and the first node N1 of the driving transistor DRT.

The scan transistor SCT can be turned on by the scan pulse SCAN having a turn-on level voltage, and can transfer the data voltage Vdata supplied from the data line DL to the first node N1 of the driving transistor DRT.

Here, in the situation that the scan transistor SCT is an n-type transistor, the turn-on level voltage of the scan pulse SCAN can be a high level voltage. If the scan transistor SCT is a p-type transistor, the turn-on level voltage of the scan pulse SCAN can be a low level voltage.

The storage capacitor Cst can be electrically connected to the first node N1 and the second node N2 of the driving transistor DRT. The storage capacitor Cst is charged with an amount of charge corresponding to the voltage difference between both ends, and serves to maintain the voltage difference between both ends for a predetermined frame time. Accordingly, during a predetermined frame time, the corresponding sub-pixel SP can emit light.

Referring to FIG. 3, each of the plurality of sub-pixels SP disposed on the display panel 110 of the display device 100 according to embodiments of the present disclosure can further include a sensing transistor SENT.

The sensing transistor SENT can be controlled by a sense pulse SENSE, which is a type of gate signal, and can be electrically connected to the second node N2 of the driving transistor DRT and a reference voltage line RVL. That is, the sensing transistor SENT is turned on or turned off according to the sense pulse SENSE supplied from a sense line SENL, which is another type of the gate line GL, and can switch an electrical connection between the reference voltage line RVL and the second node N2 of the driving transistor DRT The second node N2 of the driving transistor DRT is also referred to as a sensing node.

The sensing transistor SENT can be turned on by a sense pulse SENSE having a turn-on level voltage, and can transfer an initialization voltages VpreR, VpreS, etc. supplied from the reference voltage line RVL to the second node N2 of the driving transistor DRT. The reference voltage line RVL is also referred to as a sensing line.

A first initialization switch RPRE can switch an electrical connection between the reference voltage line RVL and a first initialization voltage supply node NpreR. The first initialization switch RPRE includes one end electrically connected to the reference voltage line RVL and the other end electrically connected to the first initialization voltage supply node NpreR.

A first initialization voltage VpreR is applied to the first initialization voltage supply node NpreR.

A second initialization switch SPRE can switch an electrical connection between the reference voltage line RVL and a second initialization voltage supply node NpreS. The second initialization switch SPRE includes one end electrically connected to the reference voltage line RVL and the other end electrically connected to the second initialization voltage supply node NpreS.

The second initialization voltage VpreS is applied to the second initialization voltage supply node NpreS. A voltage level of the second initialization voltage VpreS can be different than a voltage level of the first initialization voltage VpreR.

The first initialization voltage VpreR can be a voltage input used to initialize the voltage of the second node N2 of the driving transistor DRT when the data voltage Vdata for image display is input to the data line DL. For example, the data voltage Vdata for image display is supplied to the first node N1 of the driving transistor DRT, and the first initialization voltage VpreR is supplied to the second node N2 of the driving transistor DRT, so that a potential difference can be generated between both ends of the storage capacitor Cst.

The second initialization voltage VpreS can be a voltage input to initialize the voltage of the second node N2 of the driving transistor DRT when a voltage for sensing the characteristic value of the sub-pixel SP is input to the data line DL. For example, the voltage Vdata for sensing the characteristic value of the sub-pixel SP is supplied to the first node N1 of the driving transistor DRT, and the second initialization voltage VpreS can be supplied to the second node N2 of the driving transistor DRT, so that a potential difference can be generated between both ends of the storage capacitor Cst.

A power management circuit can generate the first initialization voltage VpreR and/or the second initialization voltage VpreS, and output the generated voltage to each node.

The sensing transistor SENT can be turned on by a sense pulse SENSE having a turn-on level voltage, and transfer the voltage of the second node N2 of the driving transistor DRT to the reference voltage line RVL.

Here, if the sensing transistor SENT is an n-type transistor, the turn-on level voltage of the sense pulse SENSE can be a high level voltage. If the sensing transistor SENT is a p-type transistor, the turn-on level voltage of the sense pulse SENSE can be a low level voltage.

A function of the sensing transistor SENT for transferring the voltage of the second node N2 of the driving transistor DRT to the reference voltage line RVL can be used when driving to sense the characteristic value of the sub-pixel SP. In this situation, the voltage transferred to the reference voltage line RVL can be a voltage for calculating the characteristic value of the sub-pixel SP or a voltage in which the characteristic value of the sub-pixel SP is reflected.

Each of the driving transistor DRT, the scan transistor SCT, and the sensing transistor SENT can be an n-type transistor or a p-type transistor. In embodiments of the present disclosure, for convenience of description, each of the driving transistor DRT, the scan transistor SCT, and the sensing transistor SENT is an n-type as an example.

The storage capacitor Cst does not have to be a parasitic capacitor (e.g., Cgs, Cgd) which is an internal capacitor between the gate node and the source node (or drain node) of the driving transistor DRT, but can be an external capacitor intentionally designed outside the driving transistor DRT.

The scan line SCL and the sense line SENL can be different gate lines GL. In this situation, the scan pulse SCAN and the sense pulse SENSE can be separate gate signals, and the on-off timing of the scan transistor SCT and the on-off timing of the sensing transistor SENT in one sub-pixel SP can be independent. That is, the on-off timing of the scan transistor SCT and the on-off timing of the sensing transistor SENT in one sub-pixel SP can be the same or different.

Alternatively; the scan line SCL and the sense line SENL can be the same gate line GL. That is, the gate node of the scan transistor SCT and the gate node of the sensing transistor SENT in one sub-pixel SP can be connected to one gate line GL. In this situation, the scan pulse SCAN and the sense pulse SENSE can be the same gate signal, and the on-off timing of the scan transistor SCT and the on-off timing of the sensing transistor SENT in one sub-pixel SP can be the same.

The structure of the sub-pixel SP shown in FIG. 3 is merely an example, and can be variously modified by further including one or more transistors or further including one or more capacitors.

In addition, in FIG. 3, the sub-pixel SP structure is described assuming that the display device 100 is a self-luminous display device. However, in the situation that the display device 100 is a liquid crystal display device, each sub-pixel SP can include a transistor and a pixel electrode.

Referring to FIG. 3, the display device 100 according to embodiments of the present disclosure can include a line capacitor Crvl. The line capacitor Crvl can be a capacitor element having one end electrically connected to the reference voltage line RVL or a parasitic capacitor formed on the reference voltage line RVL.

Meanwhile, the above-described data driving circuit can include one or more source driver integrated circuits SDICs.

Referring to FIG. 3, the source driver integrated circuit SDIC can include a digital-to-analog converter DAC. The timing controller 140 can convert input image data according to a preset interface and output the converted image data to a digital-to-analog converter DAC.

The source driver integrated circuit SDIC can further include an analog-to-digital converter ADC in some situations. The analog-to-digital converter ADC can sense the voltage value of the reference voltage line RVL. The voltage sensed by the analog-to-digital converter ADC can be a voltage in which the characteristic value of the sub-pixel SP is reflected.

A sampling switch SAM can be configured to switch an electrical connection between the analog-to-digital converter ADC and the reference voltage line RVL. The sampling switch SAM can be disposed in the source driver integrated circuit SDIC.

Meanwhile, the characteristic value of the sub-pixel SP can be a characteristic value of the driving transistor DRT or the light emitting device ED. The characteristic value of the driving transistor DRT can include a threshold voltage and mobility of the driving transistor DRT. The characteristic value of the light emitting device ED can include a threshold voltage of the light emitting device ED.

The analog-to-digital converter ADC can receive an analog voltage, convert the analog voltage into a digital value, and output the digital value to the timing controller 140.

The timing controller 140 can include a memory 310 storing characteristic value information of the sub-pixel SP, and a compensation circuit 320 for performing a calculation for compensating for a change in the characteristic value of the sub-pixel SP based on information stored in the memory 310.

Information for compensating the characteristic value of the sub-pixel SP can be stored in the memory 310. For example, information on the threshold voltage and mobility of the driving transistor DRT of each of the plurality of sub pixels SP can be stored in the memory 310, or information on the threshold voltage of the light emitting device ED included in the sub-pixel SP can be stored in the memory 310.

Information on the threshold voltage of the light emitting device ED can be stored in a lookup table LUT of the memory 310.

The compensation circuit 320 can calculate the degree of change in the characteristic value of the sub-pixel SP based on the digital value input from the analog-to-digital converter ADC and the characteristic value information of the sub-pixel SP stored in the memory 310. The characteristic value of the sub-pixel SP stored in the memory 310 can be updated based on the calculated information.

The timing controller 140 can convert the image data by reflecting the change in the characteristic value of the sub-pixel SP calculated by the compensation circuit 320 and output the converted image data to the digital-to-analog converter DAC.

The digital-to-analog converter DAC can output the data voltage Vdata in which the characteristic value change of the sub-pixel SP is reflected to the data line DL.

The above process of sensing and compensating for a change in the characteristic value of the sub-pixel SP is also referred to as a "sub-pixel characteristic value compensation process."

Figure 4:
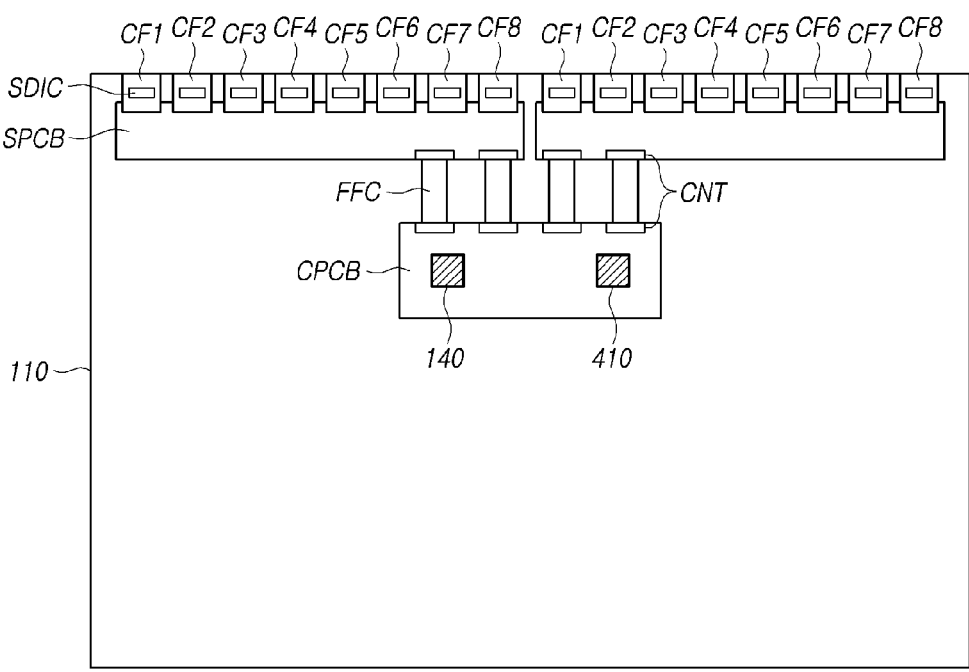
FIG. 4 illustrates components configured to supply various voltages to a display panel in a display device according to embodiments of the present disclosure.

FIG. 4 illustrates components configured to supply various voltages to a display panel 110 in a display device according to embodiments of the present disclosure.

Referring to FIG. 4, a display device according to embodiments of the present disclosure can include one or more circuit films CF connected to the display panel 110, and a source driver integrated circuit SDIC mounted on the circuit film CF.

Referring to FIG. 4, one end of the circuit film CF can be connected to the display panel 110. One end of the circuit film CF can be bonded to a pad portion of the display panel 110. The circuit film CF can be bonded to a pad portion positioned on the front surface of the display panel 110 and bent in the rear direction of the display panel 110.

The other end of the circuit film CF can be connected to a source printed circuit board SPCB.

The source printed circuit board SPCB can be connected to the other end of one or more circuit films CF. For example, referring to FIG. 4, one source printed circuit board SPCB can be connected to first to eighth circuit films CF1 to CF8.

The source printed circuit board SPCB can be electrically connected to a control printed circuit board CPCB through a connection member.

The connecting member, for example, can be implemented as a flexible flat cable (FFC). The flexible flat cable (FFC) can be connected to a connector CNT disposed on the source printed circuit board SPCB and the control printed circuit board CPCB, respectively, and can electrically connect between the source printed circuit board SPCB and the control printed circuit board CPCB.

The timing controller 140 can be mounted on the control printed circuit board CPCB. A power management circuit 410 can be further mounted on the control printed circuit board CPCB. One control printed circuit board CPCB can be connected to two or more source printed circuit boards SPCBs.

Meanwhile, referring to FIG. 4, in the situation that the display panel 110 is a flexible display panel, the shape of the display panel 110 can be changed.

For example, as shown in FIG. 2, the display device 100 can be bent during the transforming period based on a bending axis extending in the vertical direction. Accordingly, the shape of the display panel 110 can also be bent based on the bending axis.

If the display panel 110 is bent, stress can be applied to the circuit film CF configured to electrically connect the display panel 110 and the source printed circuit board SPCB.

In particular, in the direction of both ends of the source printed circuit board SPCB, this stress can act more strongly, and a stronger force can be applied to the circuit film (e.g., CF1~CF8) connected at both ends of the source printed circuit board SPCB.

Accordingly, the bonding between the display panel 110 and the circuit film CF can be weakened. For example, bonding of the circuit film CF connected to both ends of the source printed circuit board SPCB to which the greatest stress is applied can be poor (e.g., one of the circuit film CF may get peeled off or disconnected).

Accordingly, there is desired a method for easily detecting the bonding state of one or more circuit films CF. Furthermore, there is a need for a method to increase the durability and expand the lifespan of the display device by adaptively changing the transforming characteristic values (e.g., the length of the transforming period, bending curvature, etc.) of the display device based on the bonding state of the circuit film CF.

Figure 5:
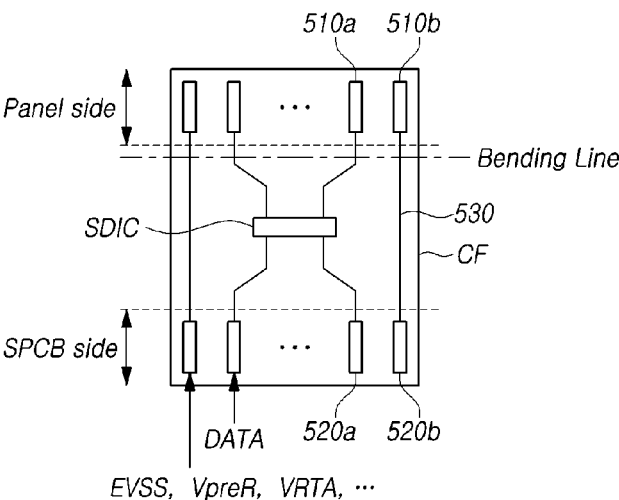
FIG. 5 specifically illustrates a circuit film according to an embodiment of the present disclosure.

FIG. 5 specifically illustrates a circuit film CF, and a plurality of circuit films CF can be included in the display device.

Referring to FIG. 5, the source driver integrated circuit SDIC can be mounted on the circuit film CF. The source driver integrated circuit SDIC can be disposed on the circuit film CF in a chip-on-film (COF) type.

The circuit film CF can include one or more first pins 510a and one or more second pins 510b connected to the display panel, and one or more third pins 520a and one or more fourth pins 520b connected to the source printed circuit board SPCB.

The one or more first pins 510a are configured to output the data voltage transferred from the source driver integrated circuit SDIC to the display panel.

The one or more second pins 510b can be electrically connected to the fourth pins 520b. The circuit film CF can further include a line 530 for electrically connecting the second pin 510b with the fourth pin 520b. The circuit film CF can further include a line 530 for electrically connecting the source driver integrated circuit SDIC with the first pin 510a. The circuit film CF can further include a line 530 for electrically connecting the third pin 520a with the source driver integrated circuit SDIC.

A direct current (DC) voltage (e.g., a low potential driving voltage EVSS, a first initialization voltage VpreR, etc.) transmitted from the source printed circuit board SPCB can be input to one or more fourth pins 520b.

An analog-to-digital converter reference voltage VRTA transmitted from the source printed circuit board SPCB can be input to one or more fourth pins 520b.

The analog-to-digital converter can convert the input analog voltage into a digital value within a preset range and outputs the digital value. The relationship between the input analog voltage and the converted digital value can have linearity expressed as a linear function. For some reason, there may occur an abnormality in which the analog voltage value input to the analog-to-digital converter cannot be converted to digital values with linearity, an abnormality in which the slope of the linear function fluctuates, or an abnormality in which an offset value fluctuates. The analog-to-digital converter reference voltage VRTA can be input to the analog-to-digital converter and a digital value output from the analog-to-digital converter can be detected, so that it is possible to check whether an abnormality has occurred in the analog-to-digital converter.

In the situation that the analog-to-digital converter is located inside the source driver integrated circuit SDIC, the analog-to-digital converter reference voltage VRTA can be input to the source driver integrated circuit SDIC.

The voltage input to the fourth pin 520b can be transmitted to the second pin 510b through the line 530. The one or more second pins 510b can transmit the DC voltage transmitted through the line 530 to the display panel.

Image data DATA input from the timing controller can be input to one or more third pins 520a. The image data DATA can be image data converted according to a preset interface (e.g., an LVDS interface, etc.). The data driving control signal input from the timing controller can be input to one or more third pins 520a.

The image data DATA input to the one or more third pins 520a can be transmitted to the source driver integrated circuit SDIC through the line 530.

The source driver integrated circuit SDIC can output a data voltage to one or more first pins 510a based on the input image data DATA.

The one or more first pins 510a and one or more second pins 510b can be connected to a pad portion disposed on the display panel. One or more third pins 520a and one or more fourth pins 520b can be electrically connected to a pad portion of the source printed circuit board SPCB.

The circuit film CF can be bent at a bending line such that at least a portion of the circuit film CF is disposed on the rear side of the display panel (e.g., the circuit films CF can be bent or folded so that they can be disposed behind the display panel).

Figure 6:
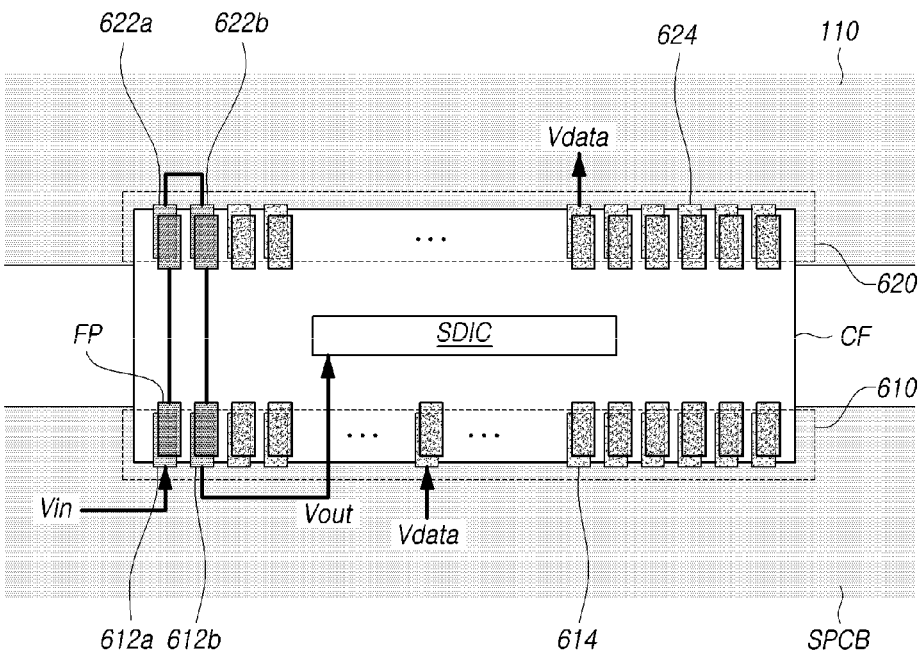
FIG. 6 illustrates an electrical connection relationship for detecting a bonding degree of a circuit film in a display device according to embodiments of the present disclosure.

FIG. 6 illustrates an electrical connection relationship for detecting a bonding degree of a circuit film CF in a display device according to embodiments of the present disclosure.

Referring to FIG. 6, in the display device according to embodiments of the present disclosure, the input voltage Vin transferred to a pad portion 610 (hereinafter referred to as a first pad portion) of the source printed circuit board SPCB through the source printed circuit board SPCB is input to a pad portion 620 (hereinafter referred to as a second pad portion) of the display panel 110 through the circuit film CF.

The second pad portion 620 receiving the input voltage Vin can transmit the output voltage Vout. Alternatively, the input voltage Vin input to the second pad portion 620 can be input to the first pad portion 610 through the circuit film CF, and the first pad portion 610 can transmit the output voltage Vout.

The output voltage Vout output from the first pad portion 610 or the output voltage Vout output from the second pad portion 620 can be input to the analog-to-digital converter. In the situation that the analog-to-digital converter is located inside the source driver integrated circuit SDIC, the output voltage Vout can be input to the source driver integrated circuit SDIC.

Hereinafter, for convenience of description, it is assumed that the output voltage Vout output from the first pad portion 610 is input to the analog-to-digital converter located inside the source driver integrated circuit SDIC, however, the present invention is not limited thereto.

The above embodiment will be described in detail as follows.

The input voltage Vin transmitted from the source printed circuit board SPCB is input to a first pin 612a positioned on the first pad portion 610. The input voltage Vin input to the first pin 612a can be transmitted to a film pin FP (which can correspond to the fourth pin 520b of FIG. 5) of the circuit film CF. The input voltage Vin transferred to the circuit film CF can be input to a second pin 622a positioned on the second pad portion 620.

A voltage level of the input voltage Vin transmitted to the second pin 622a can vary according to a bonding degree between the circuit film CF and the first pin 612a.

If the bonding degree between the circuit film CF and the first pin 612a is excellent, the contact area between the circuit film CF and the first pin 612a is wide, and the resistance of the first pin 612a can be small. However, if the bonding degree between the circuit film CF and the first pin 612a is poor, the contact area between the circuit film CF and the first pin 612a is narrow; and the resistance of the first pin 612a can be high. For example, if there is good electrical contact between the pins of the circuit film CF and the first and second pad portions, then resistance is low; but if there is poor electrical contact (e.g., due to peeling/unbonding), then the resistance is high.

Accordingly, a voltage in which the bonding degree between the first pin 612a and the circuit film CF is reflected can be input to the second pin 622a.

The voltage input to the second pin 622a can be input to a third pin 622b positioned in the second pad portion 620. The voltage input to the third pin 622b can reflect a bonding degree between the circuit film CF and the second pin 622a.

If the bonding degree between the circuit film CF and the second pin 622a is excellent, the contact area between the circuit film CF and the second pin 622a is wide, and the resistance of the second pin 622a can be small. However, if the bonding degree between the circuit film CF and the second pin 622a is poor, the contact area between the circuit film CF and the second pin 622a is narrow; and the resistance of the second pin 622a can be high.

Accordingly, a voltage reflecting the bonding degree between the second pin 622a and the circuit film CF can be input to the third pin 622b. In addition, as described above, a voltage reflecting the bonding degree between the first pin 612a and the circuit film CF can be input to the second pin 622a.

The voltage input to the third pin 622b can be input to a fourth pin 612b positioned in the first pad portion 610. The voltage input to the fourth pin 612b can reflect a bonding degree between the circuit film CF and the third pin 622b. The reason why the voltage input to the fourth pin 612b can reflect the bonding degree between the circuit film CF and the third pin 622b is as described above.

For the same reason as described above, the output voltage Vout output from the fourth pin 612b can reflect the bonding degree between the circuit film CF and the fourth pin 612b.

Referring to FIG. 6, the output voltage Vout output from the fourth pin 612b can be input to the source driver integrated circuit SDIC.

Accordingly, the output voltage Vout input to the source driver integrated circuit SDIC can reflect the bonding degree between the circuit film CF and the source printed circuit board SPCB. In addition, the output voltage Vout input to the source driver integrated circuit SDIC can reflect the bonding degree between the circuit film CF and the display panel 110.

The input voltage Vin input to the first pin 612a can be a voltage generated and output from the power management circuit 410 (refer to FIG. 4).

The voltage level of the input voltage Vin can be set to a value of a voltage level that the analog-to-digital converter can convert into one digital value. For example, the input voltage Vin can be an analog-to-digital converter reference voltage VRTA.

Meanwhile, the first pad portion 610 can include one or more image data transfer pins 614 for transferring image data DATA to the source driver integrated circuit SDIC. The second pad portion 620 can include one or more data voltage transfer pins 624 for transferring the data voltage Vdata output from the source driver integrated circuit SDIC to a corresponding data line. One or more image data transfer pins 614 can be bonded to the circuit film CF. One or more data voltage transfer pins 624 can be bonded to the circuit film CF.

The circuit film CF illustrated in FIG. 6 can be type used for at least one or more of the first to eighth circuit films CF1 to CF8 illustrated in FIG. 4.

All of the first to eighth circuit films CF1 to CF8 illustrated in FIG. 4 can have a line structure for inputting the output voltage Vout to the source driver integrated circuit SDIC as illustrated in FIG. 6.

In some situations, circuit films (e.g., the first circuit film CF1 and the eighth circuit film CF8) positioned at both ends of the source printed circuit board SPCB among the first to eighth circuit films CF1 to CF8 illustrated in FIG. 4 can have a line structure for inputting the output voltage Vout to the source driver integrated circuit SDIC. The remaining circuit films (e.g., the second to seventh circuit films CF2 to CF7) other than the circuit films positioned at both ends of the source printed circuit board SPCB may not have a line structure as illustrated in FIG. 6. Accordingly, the circuit films CF positioned in a region where stress is concentrated due to bending can have a line structure as illustrated in FIG. 6. For example, the type of circuit film CF illustrated in FIG. 6 can be positioned in areas of the flexible display that are expected to experience the most bending stress.

Figure 7:
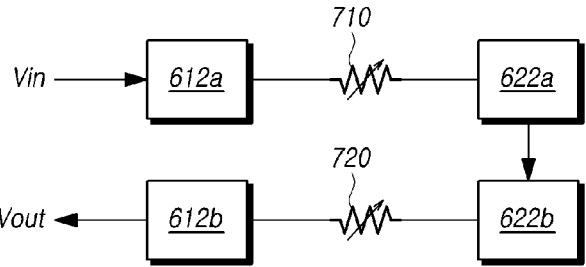
FIG. 7 schematically illustrates a principle in which an output voltage varies according to a bonding degree of a circuit film in a display device according to embodiments of the present disclosure.

FIG. 7 schematically illustrates a principle in which an output voltage Vout varies according to a bonding degree of a circuit film in a display device according to embodiments of the present disclosure.

Referring to FIG. 7, in the display device according to embodiments of the present disclosure, the voltage level of a voltage output from the second pin 622a to the third pin 622b can vary depending on the bonding degree between the circuit film and the first pin 612a and the bonding degree between the circuit film and the second pin 622a.

That is, the bonding degree between the circuit film and the first pin 612a can act as the variable resistor 710 with respect to the voltage output from the second pin 622a.

In addition, the degree of bonding between the circuit film and the second pin 622a can act as the variable resistor 710 with respect to the voltage output from the second pin 622a.

Meanwhile, depending on the degree of bonding between the circuit film and the third pin 622b and the degree of bonding between the circuit film and the fourth pin 612b, the voltage level of the output voltage Vout output from the fourth pin 612b can vary.

That is, the bonding degree between the circuit film and the third pin 622b can act as the variable resistor 720 with respect to the output voltage Vout output from the fourth pin 612b.

In addition, the bonding degree between the circuit film and the fourth pin 612b can act as the variable resistor 720 with respect to the output voltage Vout output from the fourth pin 612b.

Accordingly, the voltage level of the output voltage Vout output from the fourth pin 612b can reflect the bonding degree between the circuit film and the first pin 612a, the second pin 622a, the third pin 622b and the fourth pin 612b.

Figure 8:
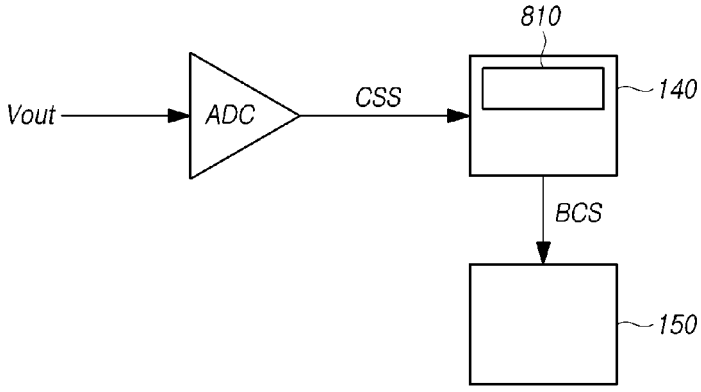
FIG. 8 illustrates an analog-to-digital converter to which an output voltage is input in a display device according to embodiments of the present disclosure.

FIG. 8 illustrates an analog-to-digital converter ADC to which an output voltage Vout is input in a display device according to embodiments of the present disclosure.

Referring to FIG. 8, in the display device according to embodiments of the present disclosure, an output voltage Vout is input to an analog-to-digital converter ADC.

The analog-to-digital converter ADC can receive the output voltage Vout, convert the output voltage into a corresponding digital value, and output a current state signal CSS. The analog-to-digital converter ADC can be located inside the above-described source driver integrated circuit SDIC. Accordingly, the current state signal CSS can be output from the source driver integrated circuit SDIC.

The current state signal CSS output from the analog-to-digital converter ADC can be input to the timing controller 140.

The timing controller 140 can calculate information on the bonding state of the circuit film based on the current state signal CSS input from the analog-to-digital converter ADC.

For example, the timing controller 140 can determine whether the bonding state of the circuit film is in a normal range state, in a slightly poor state, or in a very poor state based on the input current state signal CSS.

Furthermore, for example, if the voltage level of the output voltage Vout input to the analog-to-digital converter ADC is 6V, the analog-to-digital converter ADC can output a value of 1023 as the current state signal CSS. The value of 1023 can be a value indicating that the bonding state of the circuit film is in the normal range state.

The timing controller 140 can determine that the bonding state of the circuit film is within a normal range based on the input value of 1023.

As another example, in the situation that the voltage level of the output voltage Vout input to the analog-to-digital converter ADC is 3V, the analog-to-digital converter ADC can output a value of 500 as the current state signal CSS. The value of 500 can be a value indicating that the bonding state of the circuit film is in a slightly poor state.

The timing controller 140 can determine, based on the input value 500, that the bonding state of the circuit film is in a slightly poor state.

As another example, if the voltage level of the output voltage Vout input to the analog-to-digital converter ADC is 0V, the analog-to-digital converter ADC can output a value of 0 as the current state signal CSS. A value of 0 can be a value indicating that the bonding state of the circuit film is in a very poor state (e.g., the bonding is broken and there is a disconnection between the pins and the pads).

The timing controller 140 can determine that the bonding state of the circuit film is in a very poor state based on the input value 0.

Meanwhile, referring to FIG. 8, the timing controller 140 can output a bending control signal BCS to a host system 150 based on the input current state signal CSS. For example, the timing controller 140 can further include a memory 810 for outputting different bending control signals BCS based on the input current state signal CSS.

The host system 150 can adjust the flexible characteristic of the display device based on the bending control signal BCS input from the timing controller 140.

For example, the host system 150 can adjust a bending speed of the display device or a bending angle of the display device based on the bending control signal BCS input from the timing controller 140. Accordingly, it is possible to prevent further deterioration of the bonding state of the circuit film (e.g., as the bonding state becomes worse, control can be carried out so that bending of the flexible display is limited or prevented, in order limit or halt the damage).

Figure 9:
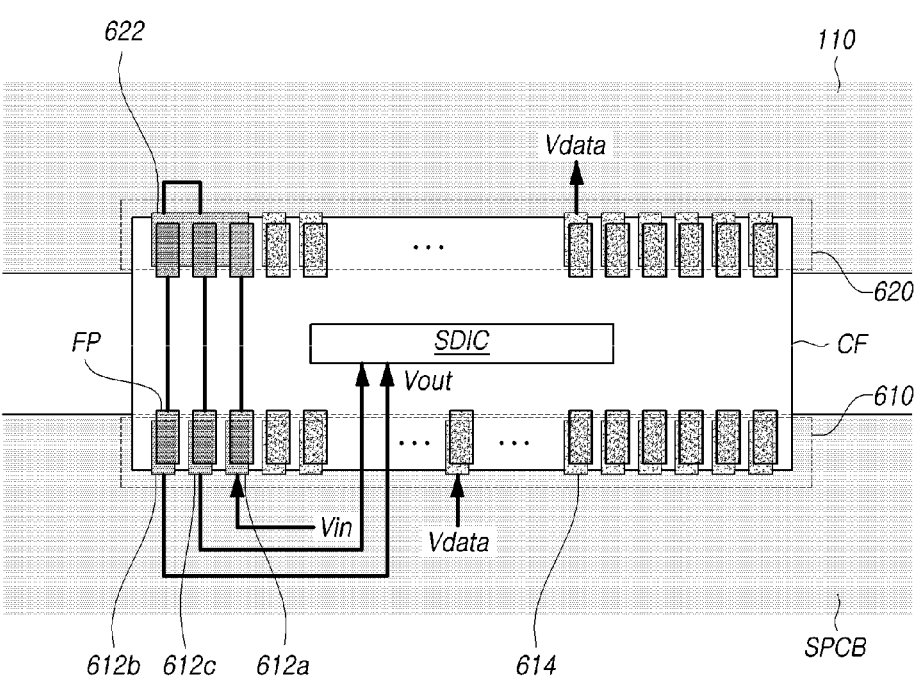
FIG. 9 is another diagram illustrating an electrical connection relationship for detecting a bonding degree of a circuit film in a display device according to embodiments of the present disclosure.

FIG. 9 is another diagram illustrating an electrical connection relationship for detecting a bonding degree of a circuit film CF in a display device according to embodiments of the present disclosure.

Referring to FIG. 9, in order to detect the bonding degree of the circuit film CF in the display device according to embodiments of the present disclosure, the input voltage Vin can be input to the first pin 612$a$ positioned on the first pad portion 610.

The input voltage Vin input to the first pin 612$a$ can be input to a wide-area pin 622 positioned in the second pad portion 620 through the circuit film CF.

The wide-area pin 622 can be connected to two or more film pins FP. For example, the wide area pin 622 in the second pad portion 620 can overlap with at least three pins in the circuit film CF.

The voltage transmitted from the wide-area pin 622 is output to one or more pins positioned on the first pad portion 610 via internal wires.

Referring to FIG. 9, the fourth pin 612$b$ and a fifth pin 612$c$ positioned on the first pad portion 610 can transmit the output voltages Vout to an analog-to-digital converter. The analog-to-digital converter can be located within the source driver integrated circuit. In this situation, the output voltage Vout can be input to the source driver integrated circuit SDIC.

The voltage level of the output voltage Vout transmitted by the fourth pin 612$b$ can reflect a bonding degree between the circuit film CF and the first pin 612$a$ and a bonding degree between the circuit film CF and the wide-area pin 622. The voltage level of the output voltage Vout transmitted by the fourth pin 612$b$ can reflect the bonding degree between the fourth pin 612$b$ and the circuit film CF.

The voltage level of the output voltage Vout transmitted by the fifth pin 612$c$ can reflect a bonding degree between the circuit film CF and the first pin 612$a$ and a bonding degree between the circuit film CF and the wide-area pin 622. The voltage level of the output voltage Vout transmitted by the fifth pin 612$c$ can reflect the bonding degree between the fifth pin 612$c$ and the circuit film CF.

Accordingly, the voltage level of the output voltage Vout transmitted from the fourth pin 612$b$ and the voltage level of the output voltage Vout transmitted from the fifth pin 612$c$ can reflect a bonding degree between the first pin 612$a$ and the wide-area pin 622 in common.

In addition, by comparing the voltage level of the output voltage Vout transmitted from the fourth pin 612$b$ with the voltage level of the output voltage Vout transmitted from the fifth pin 612$c$, there can have the same effect as comparing the bonding degree between the fourth pin 612$b$ and the circuit film CF and the bonding degree between the fifth pin 612$c$ and the circuit film CF with each other (e.g., since both of these pins should be receiving the same voltage from the wide-area pin 622, assuming bonding conditions are ideal). Accordingly, it is possible to detect in detail the location of the pin having poor bonding with the circuit film CF (e.g., an individual pin having a poor bonding state can be isolated and identified).

The first pin 612$a$ can be located on the inner side compared to the fourth pin 612$b$ and the fifth pin 612$c$. Accordingly, the possibility of a bonding defect between the first pin 612$a$ and the circuit film CF can be relatively reduced. Accordingly, by comparing the voltage level of the output voltage Vout output from the fourth pin 612$b$ and the output voltage Vout output from the fifth pin 612$c$, it can be relatively easy to accurately estimate the location of the poorly bonded pin.

Accordingly, in the display device according to embodiments of the present disclosure, the bonding state between the respective pins positioned in the pad portion and the circuit film CF can be specifically identified and determined.

Figure 10:
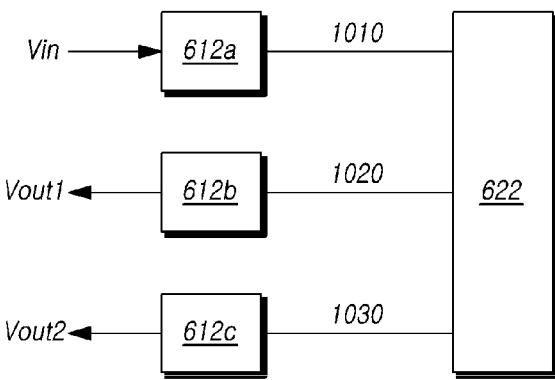
FIG. 10 is a diagram schematically illustrating that an output voltage varies according to a bonding degree of a circuit film in a display device according to embodiments of the present disclosure.

FIG. 10 is a diagram schematically illustrating that the output voltages Vout1 and Vout2 vary according to a bonding degree of a circuit film in a display device according to embodiments of the present disclosure (e.g., Vout1 and Vout2 should be the same voltage from wide-area pin 622 when bonding conditions are ideal, but as bonding deteriorates, Vout1 and Vout2 can start to diverge and be different from each other).

Referring to FIG. 10, the input voltage Vin input to the first pin 612$a$ is input to the wide-area pin 622 through a circuit film.

The voltage input to the wide-area pin 622 can be transmitted to the fourth pin 612$b$, and a first output voltage Vout1 can be output from the fourth pin 612$b$. The voltage input to the wide area pin 622 can be transmitted to the fifth pin 612$c$, and a second output voltage Vout2 can be output from the fifth pin 612$c$.

Accordingly, the change in a resistance value in a first voltage transfer path 1010 can be reflected in the first output voltage Vout1 output through a second voltage transfer path 1020. The change in the resistance value in the first voltage transfer path 1010 can be reflected in the second output voltage Vout2 output through the third voltage transfer path 1030.

In addition, the first output voltage Vout1 can reflect the bonding state between the fourth pin 612$b$ and the circuit film. The second output voltage Vout2 can reflect the bonding state between the fifth pin 612$c$ and the circuit film. Accordingly, the display device according to the embodiments of the present disclosure can easily determine the position of the pin having a poor bonding state.

Figure 11:
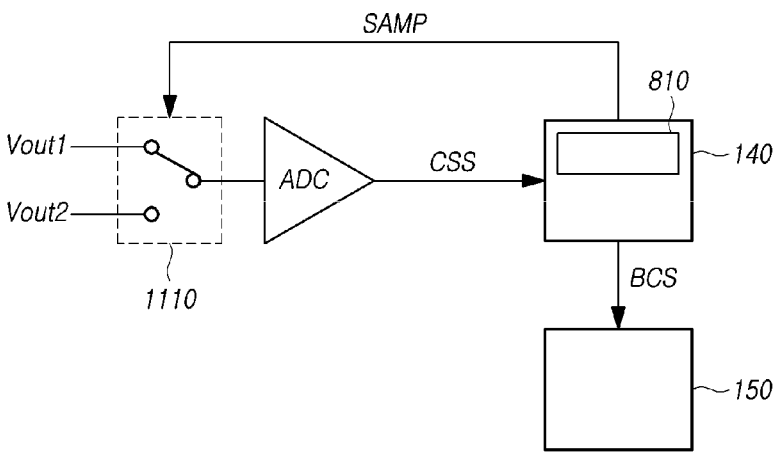
FIG. 11 illustrates an analog-to-digital converter to which a first output voltage and a second output voltage are selectively input in a display device according to embodiments of the present disclosure.

FIG. 11 illustrates an analog-to-digital converter ADC to which a first output voltage Vout1 and a second output voltage Vout2 are selectively input in a display device according to embodiments of the present disclosure.

Referring to FIG. 11, the display device according to embodiments of the present disclosure can further include a switching circuit 1110 electrically connected to an input terminal of an analog-to-digital converter ADC.

The switching circuit 1110 can include one or more switching elements. For example, the switching circuit 1110 can be implemented as a multiplexer circuit including one or more switching elements.

An output terminal of the switching circuit 1110 can be electrically connected to an input terminal of an analog-to-digital converter ADC.

The switching circuit 1110 can include two or more input terminals. For example, a first output voltage Vout1 and a second output voltage Vout2 can be respectively input to two or more input terminals of the switching circuit 1110.

Accordingly, the first output voltage Vout1 or the second output voltage Vout2 can be selectively input to the input terminal of the analog-to-digital converter ADC according to the operation of the switching circuit 1110.

The timing controller 140 can output a sampling signal SAMP for controlling the switching timing of the switching circuit 1110. An operation timing of the switching circuit 1110 can be controlled by the sampling signal SAMP.

According to the operation of the switching circuit 1110, the analog-to-digital converter ADC can output the current state signal CSS depending on the voltage level of the first output voltage Vout1, or can output the current state signal CSS according to the voltage level of the second output voltage Vout2.

The timing controller 140 can specifically determine a position of a pin having a poor bonding state, based on the current state signal CSS. The timing controller 140 can specifically determine the degree of bonding defect of the pin having poor bonding state (e.g., since the timing controller 140 can measure how much the voltage differs from the voltage expected when bonding conditions are ideal).

The timing controller 140 can output the bending control signal BCS based on the input current state signal CSS.

The host system 150 can receive the bending control signal BCS and adjust the bending characteristic or the flexible characteristic of the display device.

Figure 12:
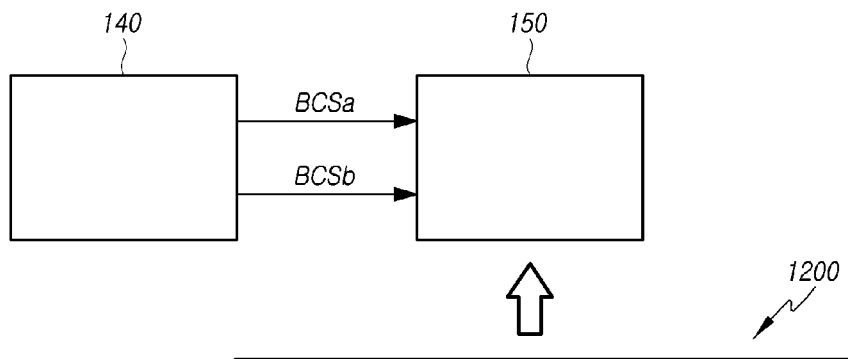
FIG. 12 illustrates a characteristic in which a host system adjusts a bending characteristic based on a bonding control signal.

FIG. 12 illustrates a characteristic in which a host system adjusts a bending characteristic based on a bonding control signal BCS.

Referring to FIG. 12, the timing controller 140 can output the bending control signal BCS to the host system 150.

The bending control signal BCS can include a first bending control signal BCSa output through a first communication line and a second bending control signal BCSb output through a second communication line.

The first bending control signal BCSa output through the first communication line can have different digital values depending on whether the bonding state of the circuit film is relatively good or bad.

For example, in the situation that the value of the first bending control signal BCSa output through the first communication line is 0, it can mean that the bonding state of the circuit film is relatively good. If the value of the first bending control signal BCSa is 1, it can mean that the bonding state of the circuit film is relatively poor.

The host system 150 may not change the bending characteristics, or can stop bending, based on the value of the first bending control signal BCSa output through the first communication line. For example, the timing controller 140 can act as a type of governor device that can control how much and how fast the flexible display device is allowed to bend based on internal bonding conditions between components. In this way, image quality can be protected and the lifespan of the display device can be extended.

Meanwhile, the timing controller 140 can output a second bending control signal BCSb to the host system 150 through the second communication line in order to adaptively change the bending characteristics of the display device according to the degree of poor bonding of the circuit film.

For example, if the bonding state of the display device is excellent, the timing controller 140 can output the combination of the first bending control signal BCSa and the second bending control signal BCSb as (0, 0) to the host system 150. The host system 150 can control the display panel to normally perform a bending operation (e.g., bending operations can be carried out normally at a relative quick speed and high degree of bending).

For example, if the bonding state of the display device is slightly poor, the timing controller 140 can output the combination of the first bending control signal BCSa and the second bending control signal BCSb as (0, 1) to the host system 150. The host system 150 can reduce or decrease the bending speed of the display device, thereby relieving stress that can act on the circuit film (e.g., slow down the bending operations).

For example, if the bonding state of the display device becomes worse, the timing controller 140 can output the combination of the first bending control signal BCSa and the second bending control signal BCSb as (1, 0) to the host system 150. The host system 150 can further relieve stress acting on the circuit film by increasing a bending curvature of the display device (e.g., decrease the amount of bending that is allowed so that there is larger radius of curvature).

For example, if the bonding state of the display device is the worst, the timing controller 140 can output the combination of both of the first bending control signal BCSa and the second bending control signal BCSb as (1, 1) to the host system 150. The host system 150 can control the display device not to bend, so that the stress to the circuit film does not act.

Accordingly, the timing controller 140 can output a signal for changing the bending characteristics (e.g., bending speed, bending curvature, etc.) of the display device to the host system 150 according to the bonding state of the circuit film. The host system 150 can dynamically change the bending characteristics of the display device in stages as the internal bonding states of the circuit films deteriorate over time.

The host system 150 can perform the above operation based on a value stored in a lookup table 1200 stored in advance.

Accordingly, the display device according to the embodiments of the present disclosure can provide a display device in which flexible characteristics are adjusted according to a connection state between components of the flexible display device.

The above description in terms of the voltage transmitted through the circuit film CF is as follows.

Referring to FIGS. 6 and 12 together, the voltage output from the second pin 622a or the voltage output from the third pin 622b can be a voltage reflecting the degree of bonding defect between the circuit film and the first pin 612a. In addition, the voltage output from the fourth pin 612b can be a voltage reflecting up to the degree of bonding defect between the circuit film and the second pin 622a and the third pin 622b.

Accordingly, the voltage output from the pad portion 620 of the display panel (hereinafter, refer to FIG. 6) or the pad portion 610 (hereinafter, refer to FIG. 6) of the source printed circuit board can be measured through the line of the circuit film, thereby easily determining whether the circuit film CF has a bonding defect. For example, a voltage output from the pad portion 620 of the display panel or the pad portion 610 of the source printed circuit board can be input to the analog-to-digital converter, so that the degree of bonding defect of the circuit film CF can be easily identified.

Accordingly, in the display device according to embodiments of the present disclosure, the display panel (or display device) can have different flexible characteristics depending on the magnitude of the voltage output from the pad portion 620 of the display panel or the pad portion 610 of the source printed circuit board.

For example, in the situation that the level of the voltage output from the pad 620 of the display panel or the pad portion 610 of the source printed circuit board and input to the analog-to-digital converter is included in a predetermined first range, the display panel can be bent normally.

For example, if the level of the voltage output from the pad portion 620 of the display panel or the pad portion 610 of the source printed circuit board and input to the analog-to-digital converter is included in a second range, which is a voltage level range lower than the first range, the bending speed of the display panel can be slowed or be decreased. The second range can be a predetermined voltage level section.

In addition, for example, if the level of the voltage output from the pad portion 620 of the display panel or the pad portion 610 of the source printed circuit board and input to the analog-to-digital converter is included in a third range, which is a voltage level range lower than the first range, the bending curvature of the display panel can increase. The third range can be a preset voltage level range.

The third range and the second range can be non-over-lapping ranges or overlapping ranges.

That is, in some situations, there can exist a voltage level range in which the bending speed of the display panel becomes slow (the voltage level corresponds to the second range) and the curvature at which the display panel is bent also increases (the voltage level corresponds to the third section).

For example, if the level of the voltage output from the pad portion 620 of the display panel or the pad portion 610 of the source printed circuit board and input to the analog-to-digital converter is included in a fourth range, which is a voltage level range lower than the first range, the display panel may not enter the transforming period.

That is, if the level of the voltage input to the analog-to-digital converter is lower than the specific threshold voltage, it can be understood that the resistance is very large due to the bonding defect of the circuit film, and accordingly, the display panel (or the display device) can be controlled so that the flexible operation is no longer performed.

The above-described embodiments of the present disclosure can be briefly summarized as follows.

The embodiments of the present disclosure can provide a display device 100 including a display panel 110 including a display area AA in which a plurality of sub-pixels are disposed, and a non-display area NA positioned around the display area AA and in which a pad portion is disposed, a printed circuit board PCB including a pad portion for outputting a plurality of voltages input to the display panel 110, a circuit film CF including one end connected to a first pad portion 610 which is the pad portion of the printed circuit board PCB and the other end connected to a second pad portion 620 which is the pad portion of the display panel 110, and an analog-to-digital converter ADC for receiving a voltage output from the first pad portion 610 or a voltage output from the second pad portion 620 through a line 530 of the circuit film CF electrically connecting the first pad portion 610 and the second pad portion 620, and outputting a digital value (e.g., CSS) corresponding to the voltage (e.g., Vout) input.

The embodiments of the present disclosure can provide a display device 100 which is a flexible display device being bent up to a predetermined angle during a transforming period.

In the analog-to-digital converter ADC of the embodiments of the present disclosure, a level of the voltage (e.g., Vout) input can vary according to a bonding degree between the one end of the circuit film CF and the printed circuit board PCB and a bonding degree between the other end of the circuit film CF and the display panel 110.

In the embodiments of the present disclosure, a plurality of data lines DL electrically connected to the plurality of sub-pixels SP can be disposed in the display area AA, and a source driver integrated circuit SDIC for supplying data voltages Vdata to the plurality of data lines DL can be disposed on the circuit film CF in a chip-on-film (COF) type.

In the embodiments of the present disclosure, the analog-to-digital converter ADC can be located within the source driver integrated circuit SDIC.

The embodiments of the present disclosure can provide a display device 100 further including a timing controller 140 for receiving the digital value (e.g., CSS) output from the analog-to-digital converter ADC.

In the embodiments of the present disclosure, the timing controller 140 can output a bending control signal BCS for adjusting a bending characteristic of the display device 100 based on the digital value (e.g., CSS) input.

The embodiments of the present disclosure can provide a display device 100 further including a host system 150 receiving the bending control signal BCS.

In the embodiments of the present disclosure, the host system 150 can adjust a length of the transforming period during which a shape of the display device 100 is changed.

In the embodiments of the present disclosure, the host system 150 can adjust a bending curvature at which the display device 100 is bent.

In the embodiments of the present disclosure, the host system 150 can control the display device 100 not to enter the transforming period.

In the embodiments of the present disclosure, the timing controller 140 can output a control signal BCS for differently controlling a flexible characteristics of the display device 100 in stages based on a bonding state between the display panel 110 and the circuit film CF.

In the embodiments of the present disclosure, the analog-to-digital converter ADC can receive voltages from two different pins (e.g., a fourth pin 612*b* and a fifth pin 612*c*) positioned on the first pad portion 60, respectively.

The embodiments of the present disclosure can provide a display device 100 further including a switching circuit 1110 for switching an electrical connection between the two different pins and the analog-to-digital converter ADC.

In the embodiments of the present disclosure, the printed circuit board PCB can be a source printed circuit board SPCB to which voltages input to the display panel are transmitted.

The embodiments of the present disclosure can provide a display device 100 including a display panel 110 including a display area AA in which a plurality of sub-pixels SP are disposed, and a non-display area NA positioned around the display area AA and in which a pad portion is disposed, a printed circuit board SPCB including a pad portion for outputting a plurality of voltages input to the display panel 110, a circuit film CF including one end connected to a first pad portion 610 which is the pad portion of the printed circuit board SPCB and the other end connected to a second pad portion 620 which is the pad portion of the display panel 110, and an analog-to-digital converter ADC for receiving a voltage output from the first pad portion 610 or a voltage output from the second pad portion 620 through a line 530 of the circuit film CF electrically connecting the first pad portion 610 and the second pad portion 620, in which a flexible characteristic of the display panel 110 varies according to a voltage value input to the analog-to-digital converter ADC.

In the embodiments of the present disclosure, when the voltage value input to the analog-to-digital converter ADC decreases, a bending speed of the display panel can be decreased.

In the embodiments of the present disclosure, when the voltage value input to the analog-to-digital converter ADC decreases, a bending curvature at which the display panel is bent can increase (e.g., the allowed bending amount can be decreased, by changing the previously allowed radius of curvature from a small radius (e.g., large about of bending) to a larger radius of curvature (e.g., small amount of bending)).

In the embodiments of the present disclosure, when the voltage value input to the analog-to-digital converter ADC decreases, the display device 100 can be fixed to a normal state without entering a transforming period.

In this way, the embodiments of the present disclosure can accurately detect and identify impaired internal bonding conditions and their specific locations within a flexible display device, and dynamically adjust the allowed bending characteristics of the flexible display device based the identified internal bonding conditions, in order to maintain high image quality and extend the lifespan of the flexible display device. Also, the embodiments of the present disclosure can better detect defective or impaired flexible display devices at the time of manufacture.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A display device comprising:
a display panel including a display area in which a plurality of sub-pixels are disposed, and a non-display area positioned adjacent to the display area and in which a second pad portion is disposed;
a printed circuit board including a first pad portion for outputting a plurality of voltages to the display panel;
a circuit film including a first end connected to the first pad portion of the printed circuit board and a second end connected to the second pad portion of the display panel;
an analog-to-digital converter configured to receive a voltage output from the first pad portion or a voltage output from the second pad portion through a line in the circuit film electrically connecting the first pad portion with the second pad portion, and output a digital value corresponding to the received voltage for detecting a bonding state of at least one internal component within the display device;
a timing controller configured to receive the digital value output from the analog-to-digital converter and output a bending control signal for adjusting a bending characteristic of the display device based on the received digital value, the bending characteristic being one of a bending speed and a bending curvature of the display device in a direction perpendicular to a main surface of the display panel; and a host system configured to receive the bending control signal and adjust the bending characteristic of the display device according to the bending control signal,
wherein an input voltage is transferred to the first pad portion and input to the second pad portion through the circuit film, and
wherein the second pad portion receiving the input voltage transmits an output voltage to the analog-to-digital converter or wherein the second pad portion receives the input voltage input to the first pad portion through the circuit film and the first pad portion transmits the output voltage to the analog-to-digital converter.

2. The display device of claim 1, wherein the display device is a flexible display device configured to be bent by a predetermined amount based on a predetermined angle during a transforming period.

3. The display device of claim 1, wherein, in the analog-to-digital converter, a level of the received voltage varies according to a bonding degree between the first end of the circuit film and the first pad portion of the printed circuit board and a bonding degree between the second end of the circuit film and the second pad portion of the display panel.

4. The display device of claim 1, further comprising:
a plurality of data lines electrically connected to the plurality of sub-pixels and disposed in the display area; and
a source driver integrated circuit configured to supply data voltages to the plurality of data lines, the source driver integrated circuit being disposed on the circuit film in a chip-on-film type.

5. The display device of claim 4, wherein the analog-to-digital converter is located within the source driver integrated circuit.

6. The display device of claim 1, wherein the host system is further configured to adjust a length of a transforming period during which a shape of the display device is changed from a bent state to an unbent state or from the unbent state to the bent state.

7. The display device of claim 1, wherein the host system is further configured to adjust a bending curvature at which the display device is bent during a transforming period.

8. The display device of claim 1, wherein the host system is further configured to prevent the display device from a transforming period during which a shaped of the display device is changed from a bent state to an unbent state or from the unbent state to the bent state, based on the bonding state of the at least one internal component within the display device.

9. The display device of claim 1, wherein the timing controller is further configured to output a control signal for differently controlling at least one flexible characteristic of the display device in stages based on a bonding state between the display panel and the circuit film.

10. The display device of claim 1, wherein the analog-to-digital converter is further configured to receive voltages from two different pins positioned on the first pad portion, respectively.

11. The display device of claim 10, further comprising a switching circuit configured to switch an electrical connection between the two different pins and the analog-to-digital converter.

12. The display device of claim 1, wherein the printed circuit board is a source printed circuit board to which voltages input to the display panel are transmitted.

13. A display device comprising:
a display panel including a display area in which a plurality of sub-pixels are disposed, and a non-display area positioned adjacent to the display area and in which a second pad portion is disposed;

a printed circuit board including a first pad portion for outputting a plurality of voltages input to the display panel;

a circuit film including a first end connected to the first pad portion of the printed circuit board and a second end connected to the second pad portion of the display panel;

an analog-to-digital converter configured to receive an output voltage output from the first pad portion or the output voltage output from the second pad portion through a line in the circuit film electrically connecting the first pad portion with the second pad portion;

a timing controller configured to receive the digital value output from the analog-to-digital converter and output a bending control signal for adjusting a bending characteristic of the display device based on the received digital value, the bending characteristic being one of a bending speed and a bending curvature of the display device in a direction perpendicular to a main surface of the display panel; and a host system configured to receive the bending control signal and adjust the bending characteristic of the display device according to the bending control signal, wherein a flexible characteristic of the display panel varies according to the output voltage input to the analog-to-digital converter, wherein an input voltage is transferred to the first pad portion and input to the second pad portion through the circuit film, and wherein the second pad portion receiving the input voltage transmits the output voltage to the analog-to-digital converter or wherein the second pad portion receives the input voltage input to the first pad portion through the circuit film and the first pad portion transmits the output voltage to the analog-to-digital converter.

14. The display device of claim 13, wherein, when the output voltage received by the analog-to-digital converter decreases, a bending speed of the display panel is decreased.

15. The display device of claim 13, wherein, when the output voltage received by the analog-to-digital converter decreases, a bending curvature at which the display panel is bent increases.

16. The display device of claim 13, wherein, when the output voltage received by the analog-to-digital converter decreases, the display device is fixed to a normal state and prevented from entering a transforming period.

17. A flexible display device comprising:

a flexible display panel including a plurality of sub-pixels, and a second pad portion;

a printed circuit board including a first pad portion for outputting a plurality of voltages to the flexible display panel;

a circuit film including a first end connected to the first pad portion of the printed circuit board and a second end connected to the second pad portion of the flexible display panel;

a controller configured to:

receive an output voltage output from the first pad portion or an output voltage output from the second pad portion through a wire line in the circuit film electrically connecting the first pad portion with the second pad portion, and output a value corresponding to a bonding state of at least one internal component within the flexible display device; and a host system configured to receive the value and adjust a bending characteristic of the flexible display device according to the value, the bending characteristic being one of a bending speed and a bending curvature of the flexible display device in a direction perpendicular to a main surface of the display panel, wherein an input voltage is transferred to the first pad portion and input to the second pad portion through the circuit film, and wherein the second pad portion receiving the input voltage transmits the output voltage to an analog-to-digital converter or wherein the second pad portion receives the input voltage input to the first pad portion through the circuit film and the first pad portion transmits the output voltage to the analog-to-digital converter.

18. The display device of claim 13, wherein the host system decreases a bending speed of the display panel in response to a decrease in the output voltage received by the analog-to-digital converter.

19. The display device of claim 13, wherein the host system increases a bending curvature at which the display panel is bent in response to a decrease in the output voltage received by to the analog-to-digital converter.

20. The display device of claim 13, wherein the host system fixes the display device to a normal state and prevents the display device from entering a transforming period in response to a decrease in the output voltage received by the analog-to-digital converter.

* * * * *